H. C. GOODRICH
Safety Device for Elevators.
No. 226,846. Patented April 27, 1880.
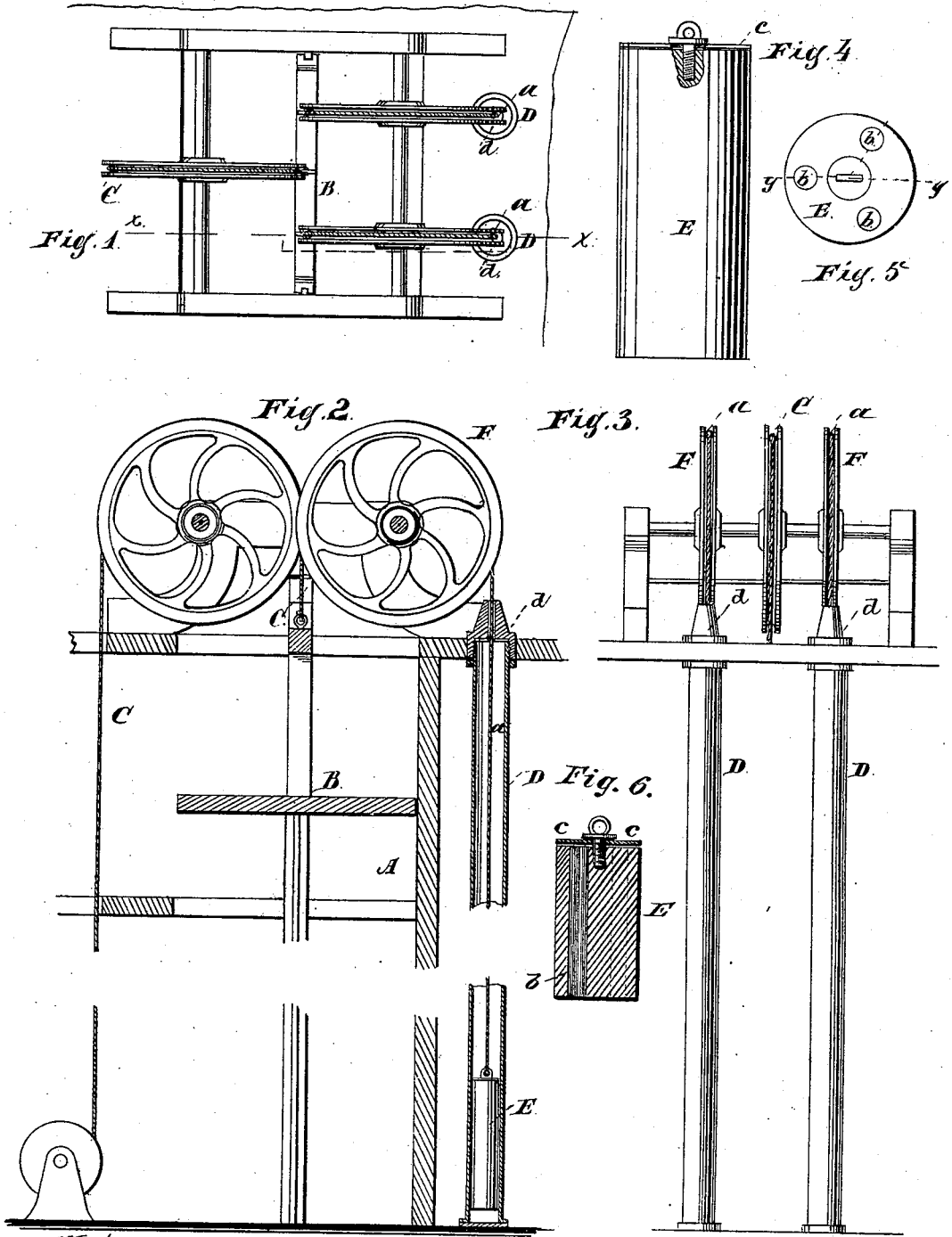
Witnesses:
O. W. Bond
J. C. Polley Jr
Inventor:
Harry C. Goodrich
By West & Bond Attys

UNITED STATES PATENT OFFICE.

HARRY C. GOODRICH, OF CHICAGO, ILLINOIS.

SAFETY DEVICE FOR ELEVATORS.

SPECIFICATION forming part of Letters Patent No. 226,846, dated April 27, 1880.

Application filed October 22, 1879.

*To all whom it may concern:*

Be it known that I, HARRY C. GOODRICH, of Chicago, Illinois, but now residing at Worcester, in the county of Worcester and State of Massachusetts, and a citizen of the United States, have invented a new and useful Improvement in Safety Devices for Elevators, of which the following is a full description, reference being had to the accompanying drawings, in which—

Figure 1 is a plan; Fig. 2, a vertical section at line $x$ of Fig. 1; Fig. 3, a side elevation; Figs. 4 and 5, details. Fig. 6 is a vertical section on line $y\ y$, Fig. 5.

This invention relates to safety devices to be used in connection with the cage or platform of elevators, for the purpose of breaking the fall of the cage or platform in case of accident to the machinery or breaking of the hoisting-rope; and it consists of one or more tubes arranged outside of the shaft in which the cage moves, in each of which tubes is a piston or plunger, which is connected with the cage or platform by means of cords, the parts being so constructed and arranged that if the cage falls its descent will be retarded and made gradual by reason of air-cushions in the tubes, as hereinafter fully described.

In the drawings, A represents a shaft, in which the platform B or the cage of an elevator moves. C is the hoisting-cord. D D are two tubes located outside of the line of travel of the cage. In each tube is a plunger, E, fitting the interior of the tube. Each plunger is connected with the cage by means of a cord or cable, $a$, which passes over a suitable pulley, F. The plunger should have considerable length and weight. As shown, it is provided with three passages, $b$, which extend through it, such passages being covered by a valve, $c$, so arranged that when the plunger descends the valve will open, and will close when the plunger ascends.

The tubes D are to be strong and air-tight, with the exception of the small opening of each in the cap $d$ at the top for the cord $a$.

I have only shown two tubes, both upon the same side of the cage; but a greater number may be used, located as may be convenient.

For ordinary purposes the tubes may be about six inches in diameter.

The cords $a$ do not bear any part of the load in the ordinary work of the elevator.

The operation is as follows: When the cage is at its lowest point the plungers E will be at or near the tops of the tubes D, and as the cage rises the plungers will descend by gravity, the air passing from that part of the tube below each plunger up through the plunger and the open valve $c$ to that part of the tube above the plunger. When the cage descends at its usual speed the plunger will rise gradually in the tube, a little air escaping, it may be, through the opening for the cord $a$ in the cap $d$ at the top of the tube, though the tubes will, of course, be always filled with air. When the plunger rises air will pass down the sides of the plunger from the space above to that below it, the plunger not being made to fit the tube in an air-tight manner. Thus the ordinary movements of the cage will not be interfered with by the action of the plungers in the tubes. If, however, the cage, in consequence of the breaking of the hoisting-cord or from other cause, descends at a high rate of speed, the air in the tubes above the plungers will be at once compressed, and the descent of the cage will be retarded.

As shown, there is a single valve, $c$, for all the openings $b$, which valve is centrally secured. I do not limit myself to this construction. A separate valve could be used for each opening, or a single opening or air-passage may be used.

What I claim as new, and desire to secure by Letters Patent, is as follows:

1. One or more air-tubes, D, each provided with a cap, $d$, and plunger connected with the cage or platform of an elevator by means of a cord or cable, $a$, substantially as and for the purposes specified.

2. In combination with the cage or platform of an elevator, one or more capped tubes, D, each provided with a plunger, E, having one or more air-passages, $b$, covered by one or more valves, $c$, the plunger E, slightly less in diameter than the inner diameter of the tube, being connected with the cage or platform by means of a cord or cable, all substantially as and for the purposes set forth.

HARRY C. GOODRICH.

Witnesses:
H. L. PARKER,
C. F. STEVENS.